US010204123B2

(12) United States Patent
Cavalcanti Dantas, Jr.

(10) Patent No.: US 10,204,123 B2
(45) Date of Patent: Feb. 12, 2019

(54) METHOD FOR ACCESSING AND AUTOMATICALLY CORRELATING DATA FROM A PLURALITY OF EXTERNAL DATA SOURCES

(71) Applicant: YTRAIL AG, Zug (CH)

(72) Inventor: Oswaldo Cavalcanti Dantas, Jr., Dubai (AE)

(73) Assignee: DATAWERKS HOLDING GMBH, Seligenstadt (DE)

( * ) Notice: Subject to any disclaimer, the term of this patent is extended or adjusted under 35 U.S.C. 154(b) by 556 days.

(21) Appl. No.: 14/763,115

(22) PCT Filed: Jan. 25, 2013

(86) PCT No.: PCT/CH2013/000015
§ 371 (c)(1),
(2) Date: Jul. 23, 2015

(87) PCT Pub. No.: WO2014/113898
PCT Pub. Date: Jul. 31, 2014

(65) Prior Publication Data
US 2015/0370843 A1    Dec. 24, 2015

(51) Int. Cl.
*G06F 17/30* (2006.01)

(52) U.S. Cl.
CPC .. *G06F 17/30342* (2013.01); *G06F 17/30002* (2013.01); *G06F 17/30554* (2013.01); *G06F 17/30867* (2013.01)

(58) Field of Classification Search
CPC ......... G06F 17/30002; G06F 17/30554; G06F 17/30342; G06F 17/30867
USPC ................................................ 707/722, 754
See application file for complete search history.

(56) References Cited

U.S. PATENT DOCUMENTS 9,405,841 B2 * 8/2016 Kapoor ......................... 707/769
2005/0251501 A1 * 11/2005 Phillips et al. .................. 707/2
2011/0023010 A1 1/2011 Kim

FOREIGN PATENT DOCUMENTS

WO    99/39289 A2    8/1999

OTHER PUBLICATIONS

Gilles Vandewiele et al., Predicting Train Occupancies based on Query Logs and External Data Sources, Jul. 17, 2004, ACM, 1469-1474.*

* cited by examiner

*Primary Examiner* — Jean B Fleurantin
(74) *Attorney, Agent, or Firm* — Rankin, Hill & Clark LLP

(57) ABSTRACT

A method for accessing and automatically correlating data from a plurality of external data sources that includes: A) defining at least two sets of data by querying a plurality of existing external data sources using user application software, a central computer and user defined search statements; B) generating a computer program code which provides access to the external data sources; C) loading the sets of data in a memory of the central computer using the computer program code to gain access to the external data sources; D) storing references which specify links to each of the sets of data provided by the external data sources in a data storage of the central computer; and E) automatically correlating data from the sets of data by using the referenced sets of data using at least one rule of correlation included in the user application software.

9 Claims, 1 Drawing Sheet

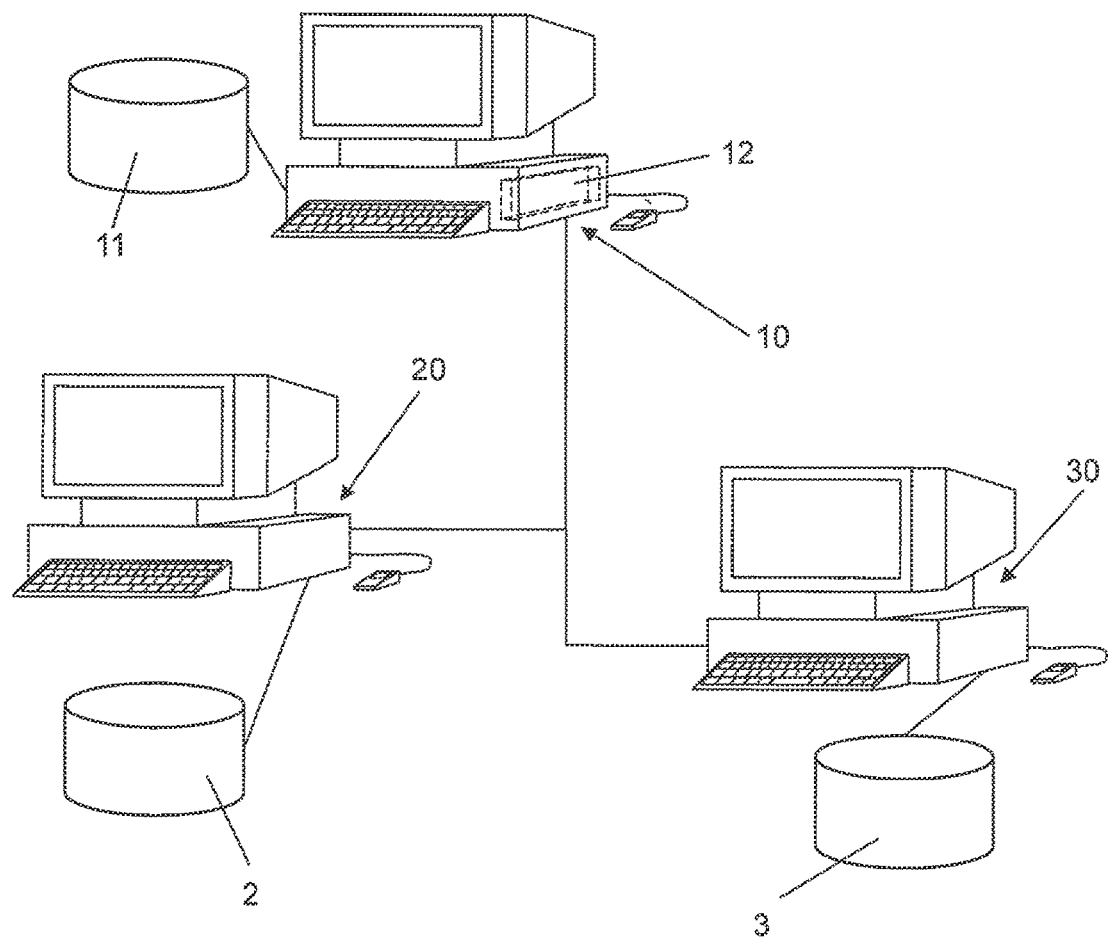

METHOD FOR ACCESSING AND AUTOMATICALLY CORRELATING DATA FROM A PLURALITY OF EXTERNAL DATA SOURCES

BACKGROUND OF THE INVENTION

1. Field of the Invention

The invention relates to a method for accessing and automatically correlating data from a plurality of external data sources.

Traditionally computer based solutions have been created to handle real life challenges. At a certain point of time, the developed software begun representing a challenge of itself, as the requirements moved to ever higher levels of abstractions. If initially a software is handling operational data, sooner or later, analytics begin being introduced and the industry seems to have crystallized around how analytics should be done, especially when considering the vast amount of data available and increasing at uncontrollable pace. Current solutions generally go from the premises that it is not reliable or even possible to efficiently query the original data source, so a copy of the data must be created in a format that support the new analytical requirements that will be provided by yet another intermediary system, taking the abstraction to a level that the common developer can build the final solution. This copy and restructuring may be done in different flavors, from being a complete copy in case of ETL (Extract, Transform and Load) processes creating structures for multidimensional querying, to a partial copy in a EAI (Enterprise Application Integration) environment by consuming webservices in different protocols. When going from one to multiple data sources, the legacy approaches are simply repeated to create the so called data warehouse as one size fits all solutions.

2. Description of the Related Art

A method for accessing structured and unstructured data like data from disparate data sources is known from US-A 2005/251501 PHILLIPS ET AL. A business process may access and integrate data from a variety of data sources. This may include identifying a data source and a subset of information of interest within the data source. The data may also be transformed and operated upon to perform the business process. Furthermore, the processed data can be published to desired destinations in desired formats, e.g. to an Excel spreadsheet or other data visualization tool. The data may be extracted from an electronic document and the data output interfaces permit a user to select data destinations and formats, such as e.g. converting data to HTML format. One problem associated with this known method is that the data is extracted from electronic documents, i.e. copied from external data sources, overlooking that as many times the original data source is in fact possible to be queried efficiently, as it is a live system meaning it is being maintained and has received investments for, among other things, having the properly sized persistence layer, sometimes not delivering faster or smarter results due to limitations on the technologies or architecture over this layer.

BRIEF SUMMARY OF THE INVENTION

It is therefore an object of the invention to provide a method for accessing and automatically correlating data by staying as close as possible to the external data sources.

The invention solves the posed problem with a method for accessing and automatically correlating data from a plurality of external data sources, which comprises:

A) defining at least two sets of data by querying a plurality of existing external data sources stored in one or more external computers by using a computing platform comprising a user application software and a central computer and by using user defined search statements;

B) generating a computer program code which provides access to the at least two external data sources;

C) loading the at least two sets of data in a memory of the central computer by using the computer program code to gain access to the at least two external data sources;

D) storing references which specify links to each of the at least two sets of data provided by the external data sources in a data storage of the central computer; and E) automatically correlating data from the two or more sets of data by using the referenced at least two sets of data loaded in the memory and by using at least one rule of correlation included in the user application software.

The advantages of the method according to the invention are essentially that:

the procedure is staying as close as possible to the external data sources due to mapping sets of data from the format of the respective external data source into the computing platform by running little or no processing at all;

no copying of data form the external data sources is required;

references to as little as possible fragments of the external data sources are used only;

a new data source can be added as simple as it would be with the legacy approaches, that can even be combined;

combined databases can be used, e.g. in a telecommunications scenario contents from a customer database could be already combined with a billing database;

data sources can be mixed;

offline data sources can be used;

the amount of reference data is smaller than what would be needed if considering the relationships and redundancies inherent from a traditional data warehousing system treating data copied from another system; and as references can be introduced as required, total storage space follows the normalized structure needs in a slower pace, while a data warehouse usually requires that all facts, copies from tables from the original system, have values for all measurements and related dimensions, greatly increasing required database storage and processing power for each newly added dimension, to a point that some solutions can simply break, situation sometimes called the database explosion phenomenon.

Definition of Terms Frequently Used Herein

Mapping means generating a computer program code which enables access to the at least two external data sources so that by using this access the at least two sets of data can be loaded in a memory of the central computer by using the computing platform. This program code, a so called connector, can be automatically generated by means of the computer platform. Once the connector is implemented in the computer platform the external data sources are mapped in the terms used herein. By means of this program code the sets of data are retained in the computer memory with essentially the same structure as the respective sets of data in the external data sources. Minor changes, e.g. of the arrangement of the data can be performed, particularly if they have minimal overhead, e.g. excess or indirect computation time, memory and/or bandwidth and if they bring a positive impact like reduced memory consumption or ease of maintenance. For instance,—in a telecommunications scenario—if the instant a certain call was made by a certain subscriber is stored in two separate fields representing the day/month/year data separate from the hour:minute:second data, when generating the program code (the connector), the two fields can be joined into one single field. Thereby irrelevant overhead is added and benefits for the development of the final solution are achieved, that can have simpler time related code, and benefits for the runtime environment, that will consume less memory to handle the same amount of data.

As the method according to the invention after being customized and deployed makes direct access to the existing data sources, there is no code generation needed at that moment from the structures perspective. Querying code generation might occur if the underlying data source needs it, like a SQL (Structured Query Language) query generated to load a certain subscriber after the method according to the invention found that a result for a certain keyword is needed from that SQL data source, but for a file system data source, there is no query language to be executed.

Code generation might also be used when starting the mapping, e.g. the customizations to accept a certain data source, as each field in a table means a variable definition in a source code file and there are tools available to generate this base source code files with the same structure a programmer would manually establish. But this also means that the method according to the invention does not depend on this kind of code generation.

References are meant to be links to each of the sets of data provided by the external data sources and enable to interpret a minimal fragment of data as something that identifies a specific entity or a set of entities in its data source. The rows in a text file or records in a database or any other concept representing a logical unit meaningful to the software user, once mapped and accessible as entities will be processed so the necessary references are stored in a format optimized for querying.

Platform [computing platform] means a hardware architecture provided by the central computer and a software framework including user software application frameworks, where the combination allows software, particularly application software to run. Typically, the platform includes apart from the computer architecture, the operating system and programming languages a related user interface.

Results mean data received by applying rules of correlation to the external data sources, wherein the rules of correlation can include data analysis procedures and are specified by a user and included in the application software of the platform.

Querying means an information retrieval process, wherein formal statements of information needs are entered into the computer, for example search strings in web search engines.

To the extent that section headings are used, they should not be construed as necessarily limiting. The terms "comprises", "comprising", "includes", "including", "having" and their conjugates mean "including but not limited to". This term encompasses the terms "consisting of" and "consisting essentially of". The phrase "consisting essentially of" means that the method may include additional steps, but only if the additional steps do not materially alter the basic and novel characteristics of the claimed composition or method. As used herein, the singular form "a", "an" and "the" include plural references unless the context clearly dictates otherwise. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". Any particular embodiment of the invention may include a plurality of "optional" features unless such features conflict.

In a special embodiment step E) of automatically correlating data comprises the sub-step of documenting unique identifiers in the different external data sources. In a further embodiment step E) of automatically correlating data comprises a use of rules of correlation based on the documented identifiers. Preferably, the method further comprises the sub-step: configuring the identifiers as data source bridges with respect to the external data sources.

In another embodiment the method further comprises after step E) the additional step: presenting the correlated data using a presentation technology included in the computing platform provided by the central computer. The presentation technology is needed to display a query result according to the software user's requirements, e.g. about what, when and how the data should be presented, so any piece of data can be presented in a result list, on a display in a detail screen or with a tab under defined conditions.

In again another embodiment the step of querying a plurality of external data sources comprises filtering restrictions and presentation layer constraints. Therewith the advantage can be achieved that the amount of data retrieved from the external data sources can be minimized.

In a further embodiment the method comprises the additional step: storing query statements in a data storage of the central computer allowing a user to automatically execute the query step when using the computing platform provided on the central computer. The information retrieval commands of a query which is often repeated, e.g. when the data in the external data sources is up-dated can be automatically performed.

In another embodiment the method comprises the step: generating a program code, wherein said computer program code provides access to the at least two external data sources so as to map data from a respective external data source into a memory of the central computer.

In a further embodiment the method additionally comprises the step: using a probe based triggering system as an alternative real time triggering system.

The probe term is referring to the act of inspecting network level information to extract necessary data when otherwise not possible. For instance, if the software user has a legacy system connected to a database over an IP network, every call from the system to the database would reflect in some packets being sent on the network for the request and some others for the reply. If there is the requirement that every time a new subscriber is created in the database, the method according to the invention should execute a certain query, sending the results by email, and at the same time the legacy system's database cannot be changed to somehow notify the platform according to the invention, this imposed limitation could be worked around by placing a probe that would detect the subscriber creation by examining the network packet and notifying the platform according to the invention when a successful subscriber creation is detected. Network probes can be deployed in different ways depending on network infrastructure characteristics, protocol limitations and probe implementation. For instance, receiving from the network router a copy of all the traffic between the targeted computers or being placed between them as a proxy, so the legacy system interacts directly with the probe as if it was the real database, which in turn redirects all traffic to its proper destination while doing the inspections in parallel.

In again a further embodiment the method comprises the additional step: using referential data stored in the data storage of the central computer as dimensions and measures in a multidimensional modeling. This configuration permits the advantage that a software platform is created which is capable of answering many questions usually directed towards OLAP (Online Analytical Processing) solutions but without the same storage requirements and cost consequences. As the references stored can be tuned to the customers specific needs, the same references can be stored in different formats targeting different persistent business entities. With this mechanism, the method according to the invention enables queries that would be otherwise considered complex for a simple OLTP (Online Transaction Processing) data source but at the same time achieving result speeds similar to those expected from an OLAP solution. In a conceptual point of view, a parallel can be done between the stored references and the fields in a fact table representing measurements or foreign keys to dimension tables (independently from topology).

Preferably, the method comprises the additional step of: visualizing the automatically correlated data on a screen.

The method according to the invention can be applied in virtually any kind of scenario, from small business to large governmental-grade institutions, from customer relationship to public health. In public health for instance, call centre records could be cross checked with hospital databases to detect and track endemic situations, and can be taken to a level where even the patients transport system usage could be accessed. The solution could add the same value to epidemic and pandemic situations.

A BRIEF DESCRIPTION OF THE DRAWINGS

A special embodiment of the invention will be described in the following by way of example and with reference to the accompanying drawings in which:

FIG. 1 illustrates a diagrammatic view of devices used in an embodiment of the method according to the invention.

DETAILED DESCRIPTION OF THE INVENTION

A special embodiment of the method according to the invention is described below exemplarily in a telecommunications scenario, where contents from a customer database could be already combined with a billing database using EII (Enterprise Information Integration) so that the method according to the invention can combine those with a file system containing recorded calls, keeping with it just the references needed for presenting the results seamlessly on a screen when looking for subscribers that mentioned a certain set of keywords in their calls. The external data sources do not need to be previously interlinked by EII (Enterprise Information Integration) or any similar means. The above reference to this situation is just to exemplify the flexibility of the method according to the invention and setting it as one abstraction layer above other integration related methods and technologies. Any scenario, with at least two external data sources to be meaningful, could be handled by the method according to the invention independently if all data sources are file systems, web services, databases or any other storage and access technologies or combination of those.

The special embodiment of the method according to the invention comprises the following steps:

Step 101: defining at least two sets of data by querying a plurality of existing external data sources 2, 3 stored on one or more external computers 20 by using a computing platform comprising a user application software and a central computer 10 and by using user defined search statements. After receiving a workshop about the method according to the invention, the data and the rules for presenting will be defined with the software user, being subscriber, in particular call detail records (CDR) and the correlated data. Exemplarily, the conditions for checking for new data are defined in this step and in this example the software user can receive the data to be processed overnight so that all data from the previous day can be queried and the investment in infrastructure to achieve the desired querying capabilities can be minimized. At the same time, the software user could be interested in reacting immediately to certain conditions, for instance, if a subscriber calls 3 times at the same day to the telecom's help desk within less than 6 hours.

Step 102: mapping and loading the at least two sets of data in a memory 12 of the central computer 10 by using the computing platform. By means of generating a computer program code the at least two sets of data 4, 5 can be accessed. Using this access the at least two sets of data are loaded from the respective external data source 2, 3 into the computer memory 12 of the central computer 10.

After the at least two sets of data are mapped and loaded in the memory 12 they are called entities and what was a data row in a database or a file in a file system is called an entity instance. As in a first moment there are no entities known to the tool and there might be terabytes of data to be processed, the tool will do the processing and storage of the entities references in a differential manner, respecting the software users definitions, so only the new and changed data is processed at each time window. New and changed data in comparison to the last processing execution is also known as delta. Once ready for processing, the data are available in the memory 12 as an entity, just as it would when it is part of a query result, so the references can be stored. The mapping of the data based on the definitions from step 101 is implemented, meaning that the components to access the above EII (Enterprise Information Integration) joined databases and the file system stored call presentations have been implemented as two data sources. Due to this step an automatic correlation with smaller resources, without copying data sets to form an even bigger data set can be achieved.

Step 103: storing references which specify links to each of the external data sources 2, 3 in a data storage 11 of the central computer 10. Once the data is in memory of the central computer 10, references to the original data are stored for each of the implemented external data sources 2, 3. This enables the solution to optimize the access to the data source as from the moment the reference has been stored, the query that will actually get to the data source is to get the specific results on demand, always considering filtering restrictions and result limits due to presentation layer constraints as paging size, minimizing the load on the original data sources to the possible minimum. As the data is treated in this uniform approach, there is no real difference from the invention's point of view if the data is structured, semi-structured or unstructured, as they are all augmented by the same querying capabilities, while retaining the features from its original data source. As only references are stored and the data itself is never copied from the data source, it is only visible in the presentation layer if the data source is available. In the case the data source is off line, the method according to the invention has built in protection for not failing together with the data source, making it possible even to inform in the presentation layer the software user not only that the data source is off line but also the number of expected results from it once it is online again. As the references are not limited to the exact value of a certain entity's property, the referencing data can also have stored internal characteristics of the data enabling queries to answer a software user's requests about all numbers from a certain telecom operator or a certain mobile cell site, if such internal characteristics where defined as required by the software user in step 101.

Preferably, the references specify the sets of data as defined in step 101. Alternatively, the references can specify a subset of the set of data as specified in step 101. Exemplarily, if a text file contains rows where each row contains columns, like a comma separated value file (.csv) that can be opened in a spreadsheet software, then it is possible to query for the the name, for instance typing "file1" and getting the result "file1.csv" but also a "file1-variation.txt" could be found and even a "someTextFile.docx" or some rows from an external data base considering that it contains an occurrence of the term "file1".

Step 104: automatically correlating data from the two or more sets of data 4, 5 by using the referenced sets of data loaded in the memory 12 and by using at least one rule of correlation included in the user application software. The correlation is independent of the origin or structure of the two or more sets of data 4, 5. The method according to the invention includes a platform for deploying highly customized solutions and its greatest benefit is the automatic correlation of results. During the analysis phase of a project using the method according to the invention the documentation of unique identifiers in the different data sources is effected and the rules of correlation base on those. These identifiers work as data source bridges, so when displaying a certain record on the presentation layer, the correlation engine can automatically and asynchronously take the bridge and present the correlated information from any of the data sources if the data exists and the data source is available. Once a subscriber entity is processed, all referential data to it is stored and readily available for querying, so in this scenario, the phone number would be a valid keyword to be used. If some CDR (Call Detail Records) entities related to that specific number are processed, querying for the number shows not only the subscriber in the result list, but also the calls made from that number.

Optionally, in further embodiments of the method according to the invention the following steps can be additionally performed:

Step 105: visualizing the automatically correlated data on a screen, e.g. the display of the central computer 10. The presentation layer can be tailor made to the user's ergonomic needs and in a default instance, the main correlated data is presented seamlessly in the main window, after one query result has been selected, and additional tabs are available to display all relevant data from the different data sources. If the user selects the row representing the subscriber, the result screen will show its details and as the correlation engine knows that there are CDR (Call Detail Records) entities related to that subscriber using the phone number as the bridge between the databases, the list of calls (translated from the CDR entities) will also be displayed in a tab. Also, as the file system structure for the call transcripts follows naming standards that allow the identification of which number and at which time did that conversation happen, it allows the correlation between the transcript and the CDR, showing the transcript seamlessly in the screen having the call list.

Once, the automatically correlated data in step 104 have been established, an optional step 106 of presenting the correlated data can be performed by using a presentation technology and keeping with it just the references needed for presenting the correlated data on a screen. Once the data are retrieved from a data source, they are directly routed to the front end of the user who requested it, not being permanently persisted anywhere in this path.

A further optional step 107 is: using of probes as alternative real time triggering system. In some cases where real time reaction is needed but the data source doesn't have a notification system, cannot be amended to have it (when a legacy database wouldn't support the needed stored procedure technology for instance) or the overhead of repeatedly sending the query to check if a notification should be triggered is unacceptable, the method according to the invention can make use of a probe based triggering system. This triggering system consists in a piece of software that will inspect the network traffic between the legacy solution and it's data source, without introducing overhead on the legacy solution, triggering the appropriate reaction in the method according to the invention when a defined pattern is detected.

Conforming to the limitations and requirements set by the software user in this scenario, as the data is being processed every night, to be able to send an email immediately about a subscriber that made 3 calls in the same day in less than 6 hours, a probe is placed in the network, reading the calls from the legacy system to the database and, once it detects this pattern that translates to 3 SQL INSERT calls and it's respective success messages in the database protocol in the same day in less than 6 hours, the probe notifies the processing component of the invention about that specific user, so it will do the exceptional access to be able to generate the required report for delivery.

Another optional step 108 is: using stored referential data as dimensions and measures in a multidimensional modeling.

With the definitions done in step 101, high level questions could have been established to be rendered in the screen so the software user can have quick, easy to interpret and contextualized information, like one would expect from a multidimensional modeling after all the implementation effort. If the user needs a bar chart displaying the total calls per number between any number and a certain selected number made last month where the caller or the callee is from the opposite sex, using vocabulary from data warehousing, in a snowflake modeling there could be a fact table Calls with a measurement on Call.id relationship to the dimension table Subscriber containing the gender property and assuming the roles of caller and callee, and the dimension tables Date and Time.

A similar description can be given with higher level abstractions, where the stored referential data for one call entity could have references to the caller and callee, including gender, besides references to the call data itself like begin/end timestamps and transcription if available. On this last element, the invention goes one step beyond traditional data warehousing as it enables a seamless structured/semi-structured/unstructured multidimensional query. This means that the stored reference to the presentation technology goes beyond locating text files with a certain keyword in its name but also consider a certain keyword in its completely unstructured content, extending the already defined query over the other structured properties of the involved entities.

Steps 102 and 103 must occur in this order because of the interdependency of the respective tasks. The querying of the data in step 101 is a user related operation, so it can happen repeatedly until the user is satisfied with the results displayed and decides to go deeper, opening a detail screen, or just ends the session by getting to a conclusion just by looking at the result list.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

The invention claimed is:

1. A method for accessing and automatically correlating data from a plurality of external data sources comprising steps of:
   A) defining at least two sets of data by querying at least two existing external data sources stored in one or more external computers by using a computing platform comprising a user application software and a central computer and by using user defined search statements, whereby statements of information needs are entered into the central computer;
   B) generating a computer program code, wherein said computer program code provides access to the at least two external data sources so as to map data from a respective external data source into a memory of the central computer;
   C) loading the at least two sets of data in the memory of the central computer by using the computer program code to gain access to the at least two external data sources;
   D) storing references which specify links to each of the at least two sets of data provided by the at least two external data sources in a data storage of the central computer;
   E) automatically correlating data from the at least two sets of data using a rule of correlation included in the user application software by accessing the at least two external data sources based on the stored references; and
   F) storing query statements in a data storage of the central computer thereby allowing a user to automatically execute a querying of the at least two existing external data sources when using the computing platform provided on the central computer.

2. The method according to claim 1, wherein step E) of automatically correlating data comprises a sub-step of documenting unique identifiers in the at least two external data sources.

3. The method according to claim 2, wherein step E) of automatically correlating data comprises a use of rules of correlation based on the documented unique identifiers.

4. The method according to claim 2, further comprising a sub-step of:
   configuring the documented unique identifiers as data source bridges with respect to the at least two external data sources.

5. The method according to claim 1, further comprising after step E) a step of:
   presenting the correlated data using a presentation technology included in the computing platform provided by the central computer.

6. The method according to claim 1, wherein querying the at least two external data sources comprises filtering restrictions and presentation layer constraints.

7. The method according to claim 1, further comprising a step of:
   using a probe based triggering system as an alternative real time triggering system.

8. The method according to claim 1, further comprising a step of:
   using referential data stored in the data storage of the central computer as dimensions and measures in a multidimensional modeling.

9. The method according to claim 1, further comprising a step of:
   displaying the automatically correlated data on a screen.

* * * * *